A. HIGLEY.
Car Starter.
No. 2,460.
Reissued Jan. 15, 1867.
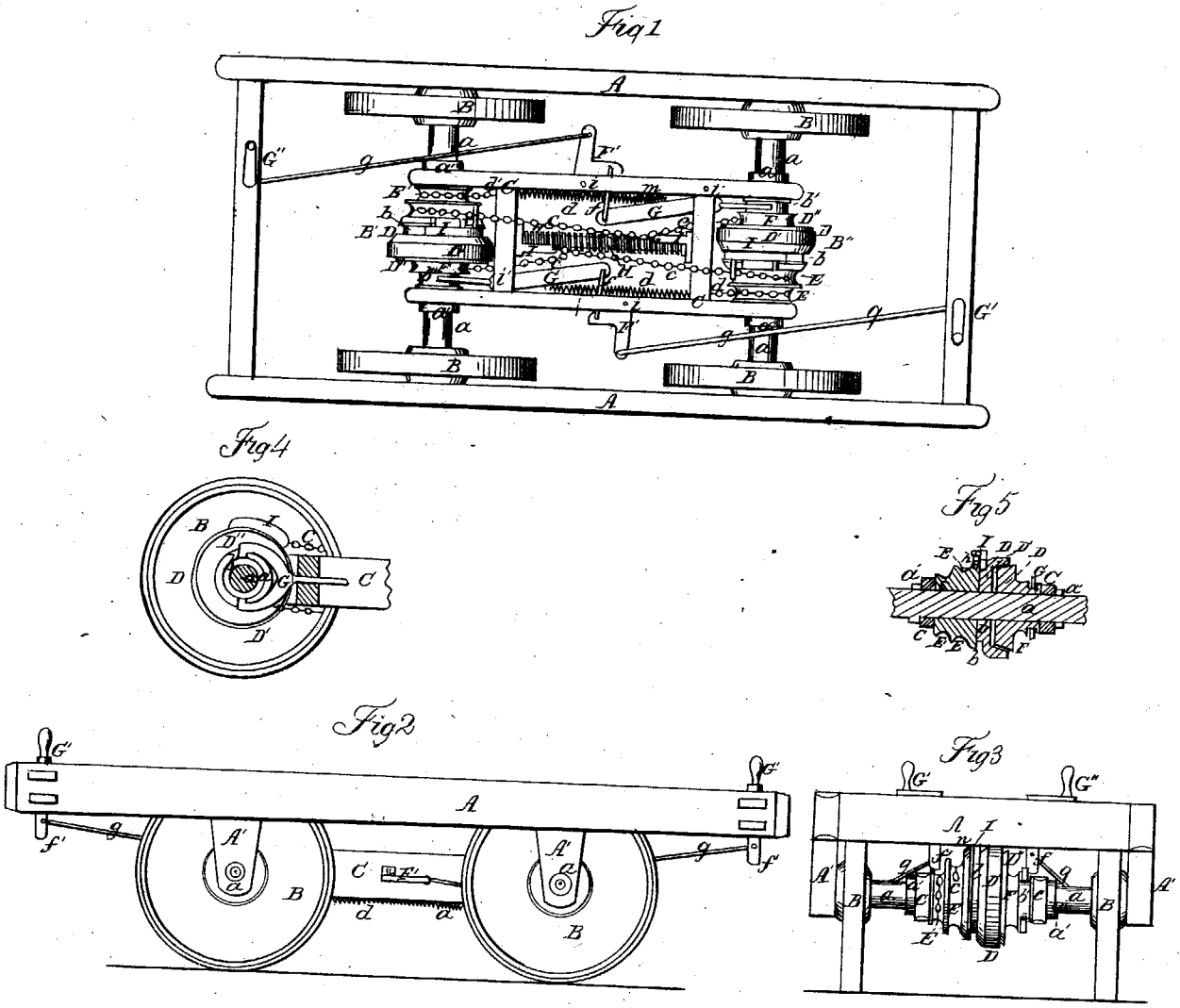
Witnesses:
W. H. Bunnup
J. Holmes
Inventor
Aaron Higley
N. PETERS, PHOTO-LITHOGRAPHER, WASHINGTON, D. C.

United States Patent Office.

AARON HIGLEY, OF SOUTH BEND, INDIANA.

*Letters Patent No.* 57,133, *dated August* 14, 1866; *reissue No.* 2,460, *dated January* 15, 1867.

IMPROVED METHOD OF BRAKING AND STARTING STREET RAILWAY CARS.

The Schedule referred to in these Letters Patent and making part of the same.

TO ALL WHOM IT MAY CONCERN:

Be it known that I, A. HIGLEY, of South Bend, in the county of St. Joseph, and State of Indiana, have invented certain new and useful improvements in Railroad Car-Brakes; and I do hereby declare that the following is a full and complete description of the construction and operation of the same, reference being had to the accompanying drawings, making a part of this specification, in which—

Figure 1 is a top view.

Figure 2 is a side view.

Figure 3 is an end view.

Figures 4 and 5 are detached sections that will be referred to in the description.

Like letters of reference refer to like parts in the several views.

In describing the device of the braking operation at one end, it is substantially the same as at the other, being constructed and operated exactly alike. When the car is going in the direction indicated by the arrow, the windlass G′ is used, operating the braking device at the opposite end, B′, and when going in the other direction the windlass G″ is used, which operates the apparatus at the end B″.

In the drawings, A represents the frame; A′ the pedestals in which the axle *a* has its bearings. C is a framework connected to the axle, to which some of the apparatus for braking is connected, this frame being held in place by the collars *a*′. On the axle *a*, and near the centre, are three wheels, wheel D′ being permanently attached to the axle *a*, and turning with it. On one side of the wheel D′ is a ratchet, *b*, and on the other side of the said wheel is a shell for the purpose of forming a friction clutch. Wheel F and D″ is loose on the axle, and turns only when the brake is in use, F being a groove in said wheel to take up a chain, and D″ being a cone to fit into the shell on the wheel D′, which forms the friction clutch D. Wheel E E′ is also loose on the axle *a*, and next to the ratchet *b*, and turns in the opposite direction from the wheel F and D″ while in use, for the purpose of retaining the power expended in braking. F′ is a lever pivoted to the frame at *i*, and is connected to the clutch-lever G by means of the link *f*, the end of the lever G being pivoted at *i* to the frame, the end clutching around the groove *b*′, in the wheel D″ and F, as shown in figs. 3 and 4, fig. 4 being a side view with the axle and wheels cut away. From the end of the lever F′ extends the rope or chain *g*, to the shaft *f*′, of the windlass G′, which is turned in braking the car. H is a bar that rests on and has its bearings in the end of the frame C. Around the bar is coiled the spring H′, at the end of which is a swivel, I′; to one end of said swivel is fastened the chain *e*, the other end being fastened to the groove F of the wheel F and D″. To the other end of the swivel is fastened one end of the chain *c*, the other end of the chain being fastened to the groove E in the wheel E and E′. To the side of the frame C is fastened the spring *d*; to one end of this spring is fastened the chain *d*′; the spring being extended, the chain is wound around in the opposite direction from the chain *c*, and made fast in the groove E, in the wheel E and E′. I is a dog pivoted to the side of wheel E, one end of which catches into the ratchet *b* on wheel D′, being operated as follows: When it is desired to stop the car the windlass G′ is turned, winding the chain *g* around the shaft *f*′; this pulls the lever F′ back, thus drawing the end of the clutch-lever G, to which the link *f* is connected, towards the frame C; the other end of the lever being pivoted to the frame, as before stated, forces the clutch along, and this hitting against the wheel F and D″, and forces the cone of said wheel into the shell of the wheel D′ so tightly, and creating so much friction that when the wheel D′ is turning with the axle *a*, the wheel F and D″ turns with it. This winds up the chain *e* and contracts the spring H′; at the same time the contraction of the spring *d* unwinds the chain *d*′ from the wheel E and E′, and winds the chain *c* in the groove E of said wheel in the opposite direction from that in which the chain *e* is wound; and the dog I catching into ratchet *b* by the action of the spring *n* under the other end of the dog, the windlass being held from turning by the ordinary means. Thus the wheels are stopped, not being permitted to turn, and the power or force expended in braking contracts the spring H′, which power is held in reserve by the means described, to be applied to start, or help to start, the car again after it has been stopped. The spring *d* is very light, being only strong enough to turn the wheel E and E′ to take up the slack of the chain *c* as the spring H′ is contracted. The clutch joint D, between the wheels D′ and F and D″, may be made straight, or at any angle desired. When it is desired to start the car again, the windlass G′ is loosened; the spring *n* will force back the lever G from the frame, and move the cone D″ from the shell of the wheel D′.

This will let the chain *c* loose, and leave all the strain of the spring H′ on the chain *c*, which chain being fast to the wheel E and E′, and the dog I catching into the ratchet *b*, and being pivoted to the wheel E and E′, prevents the wheel from turning without turning the axle *a*. The spring H′ being very powerful, as it expands it winds the chain *d*′ on the wheel E and E′, and at the same time turns the axle *a* and wheels B, thus starting the car, or helping to start it. In winding up the chain *e*, the resistance of the spring H′ as it is contracted, tends to stop the wheels, and in this way the braking the car is accomplished.

What I claim as my invention, and desire to secure by Letters Patent, is—

1. The construction and arrangement of the wheels, pulleys, levers, chains, and windlasses, in their relation to each other, in the manner and for the purpose herein described.

2. I claim the combination of the loose pulley E E′, and the loose clutch-pulley F and D″, with the clutch-wheel D′, which latter is rigidly attached to the axle *a*, in the manner and for the purpose herein described.

AARON HIGLEY.

Witnesses:

S. S. FAHNESTOCK,

T. C. CONNOLLY.